(12) United States Patent
Engelhardt et al.

(10) Patent No.: US 11,975,276 B2
(45) Date of Patent: May 7, 2024

(54) PROCESS MONITORING AND CONTROL OF FILTRATION BY MEANS OF FILTRATE MEASUREMENTS

(71) Applicant: Bayer Aktiengesellschaft, Leverkusen (DE)

(72) Inventors: Kathrin Annette Engelhardt, Leverkusen (DE); Reinhard Gross, Leverkusen (DE)

(73) Assignee: BAYER AKTIENGESELLSCHAFT, Leverkusen (DE)

( * ) Notice: Subject to any disclaimer, the term of this patent is extended or adjusted under 35 U.S.C. 154(b) by 2 days.

(21) Appl. No.: 17/047,643

(22) PCT Filed: Apr. 9, 2019

(86) PCT No.: PCT/EP2019/058886
§ 371 (c)(1),
(2) Date: Oct. 14, 2020

(87) PCT Pub. No.: WO2019/201661
PCT Pub. Date: Oct. 24, 2019

(65) Prior Publication Data
US 2021/0146284 A1    May 20, 2021

(30) Foreign Application Priority Data
Apr. 16, 2018 (EP) .................... 18167620

(51) Int. Cl.
*B01D 29/60* (2006.01)
*B01D 9/00* (2006.01)
*B01D 29/085* (2006.01)

(52) U.S. Cl.
CPC ......... *B01D 29/601* (2013.01); *B01D 9/0063* (2013.01); *B01D 29/085* (2013.01)

(58) Field of Classification Search
CPC .... B01D 25/28; B01D 29/601; B01D 29/085; B01D 29/60; B01D 29/80; B01D 9/0063;
(Continued)

(56) References Cited

U.S. PATENT DOCUMENTS 3,815,745 A * 6/1974 Bondarev .............. B01D 29/80
210/104

FOREIGN PATENT DOCUMENTS

EP      0009527 A1 * 4/1980 ................ C02F 1/00

OTHER PUBLICATIONS

Marjatta Louhi-Kultanen et al., "Filter cake washing: partial dissolution of organic particles and real-time monitoring based on Raman spectroscopy", Jun. 18, 2007.*
(Continued)

*Primary Examiner* — Akash K Varma
(74) *Attorney, Agent, or Firm* — MORRISON & FOERSTER LLP (57) ABSTRACT

Provided are methods for monitoring a filtration and washing operation on a solid-state bulk material in a filter apparatus for cake filtration. The methods include separating a solid-state bulk material in a suspension medium using a filter element for the cake filtration, leading off the suspension medium in the form of a filtrate stream into a filtrate outlet, measuring at least one parameter value of the filtrate stream over a period of time during the filtration and washing operation, and conducting a change analysis of the at least one parameter value over the period of the filtration and washing operation to achieve the end of the filtration and washing operation and/or the effectiveness of the filtration and washing operation.

5 Claims, 6 Drawing Sheets

(58) Field of Classification Search
CPC ........ B01D 9/0045; B01D 9/00; B01D 35/00; B01D 37/04; C02F 1/00
USPC ............ 210/741, 96, 104, 106, 86, 103, 108
See application file for complete search history.

(56) References Cited

OTHER PUBLICATIONS

Kopra, R. (2018), "Brown Stock Washing Optimization and Research Studies Field Results," Mikkeli University of Applied Sciences, 42 pages.
Kopra, R. et al. (2010), "Refractive index measurements for brown stock washing loss—mill investigations," Appita Journal, 63(2):131-136.
Kopra, R. et al. (2012), "Improving Brown Stock Washing by on-line Meansurement—Mill Investigations," O Papel, 73(1):79-85.
Kopra, R. et al. (2015), "Application of the refractometer in the measurement and monitoring of brown stock washing," Doctoral Dissertation, Department of Forest Products Technology, 74 pages.
Lorenz, H. et al. (2013), "Purification by Crystallization," Crystallization: Basic Concepts and Industrial Applications, First Edition. Edited by Wolfgang Beckmann, Wiley-VCH Verlag Gmbh & Co. KGaA., 131-152.
Louhi-Kultanen, M. et al. (2008), "Filter cake washing: Partial dissolution of organic particles and real-time monitoring based on Raman spectroscopy," Separation and Purification Technology, 58: 270-276.
Noerpel, S. et al. (2012), "Filter Cake Washing of Mesoporous Particles," Institute of Mechanical Process Engineering and Mechanics, Karlsruhe Institute of Technology, Karlsruhe, Germany, Chem. Eng. Technol. 35(4):661-667.
Ruslim, F. et al. (2007), "Optimization of the wash liquor flowrate to improve washing of pre-deliquored filter cakes," Chemical Engineering Science 62: 3951-3961.
Simon, L. et al. (2015), "Assessment of Recent Process Analytical Technology (PAT) Trends: A Multiauthor Review," Org. Process Res. Dev. 19: 3-62.

* cited by examiner

PROCESS MONITORING AND CONTROL OF FILTRATION BY MEANS OF FILTRATE MEASUREMENTS

CROSS REFERENCE TO RELATED APPLICATIONS

This application is a national stage application under 35 U.S.C. § 371 of International Application No. PCT/EP2019/058886, filed internationally on Apr. 9, 2019, which claims benefit of European Application No. 18167620.6, filed Apr. 16, 2018.

FIELD OF DISCLOSURE

The application relates to solutions for the monitoring, process control and supervision of a solids filtration, especially of the operation of washing these solids, in a filtration plant. The solids are a free-flowing material, typically the result of a crystallization or precipitation in the form of granules or powder, and generally also referred to as solid-state bulk material.

BACKGROUND OF DISCLOSURE

Customary production process for production of solid active ingredients from crystallization or precipitation onwards is subdivided as follows:
1. Crystallization/precipitation, also called solids formation: This step of the production process forms the solids suspended in mother liquor,
2. Filtration: the solids are separated from the mother liquor in a filtration apparatus for pressure, vacuum or centrifugal filtration (also referred to collectively as filter apparatuses hereinafter).

Customary filter apparatuses are, for example, suction filters, centrifuges, drum or disk filters etc., but also porcelain or glass funnels with flat sieving surfaces or frits, or another porous filter element. In the case of use of a suction filter, for example, the suspension to be filtered is transferred to the apparatus, the filtrate is separated from the solids under pressure or vacuum, and led off. A suction filter is shown in schematic form by way of example in FIG. 1.

Typically, in step 3 of a solids filtration, the filtercake is subsequently washed in a displacement and/or resuspension washing operation in order to "wash the solids clean", i.e. to attain the quality features required for the solids. In this step, fixed amounts of solvent (fresh or recycled) are typically distributed homogeneously over the filtercake in a fixed number of wash steps. The number of washes is dependent on the required purity of the solids. In general, the filter apparatus is not opened between the wash steps, and so sampling of the filtercake is not possible for that and other reasons.

The solids are dried in step 4. This is typically accomplished either on the pressure suction filter (suction drier) as well or in a separate drying step.

Between steps 3 and 4, there may also be formulation steps, for example addition of plasticizers, stabilizers etc.

Typically, the filtration and washing operation is regarded as a "black box" which is optimized by trial and error (Ruslim et al., Chemical Engineering Science 62 (2007) 3951-3961). Ruslim et al. addresses the problem of heterogeneous distribution of the wash media in a filtration and washing operation. He studies a measurement of the filtercake online, but prefers offline measurement, and writes that measurements of the filtercake are better, rather than measurement of the filtrate stream. He uses the measurement of the filtrate stream merely for complete examination for impurities.

SUMMARY OF THE DISCLOSURE

LOUHI-KULTANEN et al. describes a method and a measurement apparatus for control of a filtration and washing operation with a Raman spectrometer in which a measurement is likewise conducted in the filtercake. This is a local measurement (on the cake surface) or an invasive measurement method (immersion optics) that damages the filtercake. Furthermore, this method does not enable trace measurements since the measurement limit of a Raman spectrometer is 1%. LOUHI-KULTANEN et al. does not give any pointer to a measurement of the filtrate flow (LOUHI-KULTANEN et al.: "Filter cake washing: Partial dissolution of organic particles and real-time monitoring based on Raman spectroscopy", SEPARATION AND PURIFICATION TECHNOLOGY, ELSEVIER SCIENCE, AMSTERDAM, NL, vol. 59, no. 3, (2008 Feb. 4), pages 270-276, XP022453823, ISSN: 1383-5866, DOI: 10.1016/J.SEPPUR.2007.06.017).

According to the current state of the art, quality control of the solids while they are still in the filter apparatus (i.e. point 2 or 3) does not take place in industrial filtration and washing operation processes. In general, the analysis is conducted merely after conclusion of step 4. Typically, solid samples are taken from the dried filtercake and analyzed in the laboratory, usually by means of chromatography. It is generally assumed in the specialist field that the quality of the filtercake can be ascertained only by direct filtercake analysis. As a result, the monitoring of the quality of filtercakes in the filtration process has been unaffected to date by the advances of online measurement technology. If the filtercake tested does not meet the specification, the dried product therefore has to be reprocessed, discarded or cut. The amount of wash medium and the wash strategy (displacement, countercurrent or slurry wash) is typically ascertained experimentally once and validated by analysis of the filtercake.

If an early quality control of the solids were possible, it would be possible to react immediately in the event of poor quality and, for example, to conduct an additional wash (provided that the impurities can be washed out and are not included in the crystal). In the case of very good quality, it would be possible, as the case may be, to dispense with washes or wash medium and hence solvent or else water. Both variants would directly enable significant saving of costs and time.

Kopra et al. discloses a process and a measurement apparatus for control of the filtration and washing operation for the paper industry in a pulp wash with a refractometer. In this process, the refractive index of the wash medium which is guided into the filter apparatus and out of the filter apparatus is determined, with the aim of ascertaining whether the wash medium can be reused. The wash medium feed is adjusted using the measurements in order to avoid unwanted wash losses. Kopra et al. does not give any pointer as to the utilization of these measurements in order to obtain conclusions as to the progression of the washing operation or the quality of the filtercake. In view of the filter apparatus, this would not be possible in any case since there is no separate measurement from the respective wash zones. (Kopra et al. "Application of the refractometer in the measurement and monitoring of brown stock washing, doctoral dissertation", (2015 Jan. 1), XP055374630, URL:https:// aaltodoc.aalto.fi/bitstream/handle/123456789/15451/isbn9789526061344.pdf?se quence=l&isAllowed=y).]

The problem addressed was therefore that of providing a solution for monitoring of filtration and washing processes which is usable for online monitoring, enables conclusions as to the progression of the process, especially as to the quality of the filtercake, does not require any interruption of the wash process for the quality control of a filtercake and does not cause damage to the filtercake.

The object was achieved by the use of measurement technology for measurement in the filtrate stream from a filter apparatus, wherein parameter values of the filtrate stream are measured over the period of the filtration and washing operation, and the changes in these are analyzed over the period of time. It has been found that, surprisingly, this analysis during the filtration enables conclusions as to the progress and quality of the filtration and washing process.

The application firstly provides a method of monitoring and of controlling a filtration and washing operation of a solid-state bulk material in a filter apparatus for cake filtration according to claim 1 and the claims dependent thereon, wherein at least one measurement apparatus is mounted in or on the filtrate outlet of the filter apparatus, which measures one or more parameters of a filtrate stream from the filter apparatus for cake filtration during the washing operation, and the change in the parameter values measured is analyzed over the period of time.

Suitable measurable parameters of the filtrate stream in the context of the application are especially refractive index, density, ultrasound transit time, redox potential and spectroscopic cumulative and/or substance-specific properties of at least one representative constituent in the filtrate stream (main and/or secondary component), for instance absorption, impedance, color or the fluorescence signal of the filtrate. For aqueous media, it is also possible to use pH and/or conductivity.

However, the selection of the measurement method depends on the substances used in the process (especially product(s) and/or byproduct(s)). Particular preference is given to using the measurement of the refractive index and/or the density of the filtrate over the course of the filtration and wash. It is also possible to combine one or more of the abovementioned methods. It is likewise possible, for quality control, as well as the pure measurement values (raw data), also to ascertain concentrations of the (secondary) components using calibration functions ascertained beforehand.

In a preferred embodiment of the method, a parallel recording of refractive index and the measurement of the filtrate mass customary in the art (according to VDI Guideline 2762) are conducted.

The method is suitable both for the monitoring of a continuous process and for the monitoring of a batchwise process. In a continuous wash process for the purposes of the application, wash medium is metered continuously onto the filtercake, such that the filtercake is covered homogeneously over its entire area. In a batchwise process, a predefined amount of wash media is applied to the filtercake for the wash.

Preferably, the method comprises computer-implemented steps for analysis of the measurement data. Typically, these steps are performed by an appropriately configured computer system.

For the analysis of the measurement data, these are transmitted from the measurement apparatus(es), for example via a data interface (OPC, SQL, fieldbus, e.g. profibus, modbus, Ethernet, analog signal etc.); the imported measurement data are stored in an archiving module, for example a database module in which the measurement data and a timestamp t and preferably all information for clear identification of the production batch are recorded.

The database module is connected to an evaluation system. An evaluation system in the context of the application is a measurement control system or a computer configured for the performance of the method steps.

The application therefore further provides a computer system for control of a filtration and washing operation on a solid-state bulk material in a filter apparatus for cake filtration, wherein the computer system comprises:
  an archiving module configured for the storage of parameter values of a filtrate stream with a timestamp t transmitted from at least one measurement apparatus in or on the filtrate outlet of the filter apparatus over the period of the filtration and washing operation and for the transfer of these to an evaluation system,
  the evaluation system connected to the archiving module and configured to analyze changes in the parameter values over the period of time, and to use this change analysis to ascertain the end of the filtration and washing operation and/or the effectiveness of the washing operation,
  a display element for the end of the filtration and washing operation and/or the effectiveness of the washing operation, and/or
  an element for issuing a command to end the filtration and washing operation.

Typically, the evaluation system is connected to a system for control of a wash medium feed and configured to be able to issue commands for continuation or ending of the wash medium feed.

More preferably, the feed of the wash medium is started and ended with the aid of the evaluation system, or a new washing operation is occasioned by virtue of the evaluation system issuing the corresponding command to a controllable wash medium feed (e.g. valves). Typically, the wash medium feed is controllable via one or more control elements for control of the wash medium feed (e.g. a process control system).

In a particular embodiment of the method, a limit value assessment and/or change analysis is conducted.

The measurement data analysis, in a limit value assessment of the raw data or of the concentration values calculated therefrom, typically comprises the following steps:
  1. Transfer of the measurements of the monitored parameters of the filtrate stream to the evaluation system over a predefined period of time in the filtration and wash process at least until attainment of a predefined parameter value that has been ascertained experimentally beforehand or from experience and corresponds to the desired quality of the filtercake. If this value is attained, it can be assumed that the filtercake has been washed in accordance with the specification; the washing operation can be ended.
    1.1. In a continuous process, on attainment of the parameter value from 1, the feed of the wash medium is ended; the filtercake is processed further.
    1.2. In a batchwise process, the end of the wash process is communicated. For the next batch wash of a further filtercake, it is optionally possible to adjust (typically reduce) the amount of wash medium in accordance with the predefined parameter from 1. The method of adjusting the amount of wash medium is described in detail further down.

2. If the predefined parameter value (see 1.) is not attained, it can be assumed that the filtercake has not been washed optimally; the wash operation is continued by
   2.1. In a continuous process, the wash medium feed is extended.
   2.2. In a batchwise process, an additional wash may follow for the already washed cake. In the next batch with a new filtercake, the amount of wash medium can be increased.

If the predefined parameter value, in spite of the measures described (see 2.1. or 2.2.), is not attained, purification solely by the displacement of the mother liquor is inadequate. Typically, the wash strategy is altered; it is possible, for example, to conduct a slurry wash (suspension wash) or a combination of displacement and slurry washes.

Alternatively or additionally to the limit value assessment, the method comprises steps for change analysis of the raw data or of the concentration values ascertained from the raw data.

The measurement data analysis, in a change analysis of the raw data or of the concentration values calculated therefrom, typically comprises the following steps:
3. Transfer of the measurements of the monitored parameters of the filtrate stream into the evaluation system over a predefined period of time in the filtration and washing process. Calculation of the first derivative of a curve generated from the measurements. If the first derivative (=slope) of the measurement curve ceases to change or is below a predefined value, the following measures may be taken:
   3.1. In a continuous process, the feed of the wash medium is ended. In accordance with the limit value assessment from 1. (attained/not attained), further measures are optionally taken, for example a change in the wash strategy.
   3.2. In a batchwise process, the end of the wash process is communicated. For the next wash step, the amount of wash medium is optionally adjusted (reduced or increased) in accordance with the limit value assessment from 1.

In a particular embodiment of the method, the quality of the wash is ascertained from the measurement data by means of one or more further data analyses. For this purpose, the slope of the measurement curve (between two measurements, for example between measurements of the timestamp t−1 and t) is preferably calculated in period C. The calculated slope is compared with a range of values (working range) for the slope that has been predefined as being approved; this has typically been ascertained from prior washes with satisfactory quality. There are possible variances and hence faults in the washing operation or in the effectiveness of the wash when the slope leaves the working range over the course of the wash.

There are possible faults when:
a) The slope is too flat, caused, for example, by cracks in the filtercake.
b) The slope is nonuniform, caused, for example, by holes or channels in the filtercake.

The assessment of the slope enables understanding or monitoring of the process, such that suitable countermeasures can be initiated. These may be, for example: noting the (under) saturation of the filtercake, checking the filter medium used for faults, smoothing the filtercake etc.

In general, the slope is equivalent to the washing speed $\Delta conc/\Delta time$, or alternatively $\Delta measurement\ signal/\Delta time$, where $\Delta$=change. This enables process optimizations, for example
   a) An elevated slope means an elevated washing speed, which can be achieved, for example, by an elevated pressure. This results in a shorter wash time, which reduces the cycle time.
   b) A reduced slope means an increased wash time. This increases the diffusion time of the wash medium into the solid-state pore system, which can increase the wash effectiveness.

If faults are recognized, the system issues a warning; the system optionally ends the washing operation.

Effectiveness of the wash

In a particular embodiment of the method, the effectiveness of the washing operation is ascertained by the following steps:
   a) a period C in which the measurement curve changes with a slope of at least or equal to a predefined value X is ascertained from the measurement curve (see FIG. 2),
   b) a slope value is calculated as the average slope over the period C from a),
   c) a variability of the slope in section C from a) is calculated,
   d) if the slope value is within the predefined working range and the variability of the slope is less than X, washing operation is running effectively; the washing operation is continued until the slope value attains a predefined value for a sufficient wash quality,
   e) if the slope value is ≤a predefined minimum value (flat slope) and/or the variability of the slope value is high, there is a suspicion of gradient formation or discontinuity in the cake. A warning is issued and/or filtration pressure is increased.

The optimal wash ratio is determined from the analysis of the wash curve (measurement via wash ratio FIG. 3 or 5) for the subsequent batches. If there is no further change in the measurement, the optimal wash ratio, i.e. the optimal amount of wash medium, has been exceeded.

In some embodiments, the amount of wash medium consumed for the washing operation until the calculated end of the washing operation is ascertained and fixed as the optimal amount of wash medium for the next washing operation. In the case of a batchwise washing operation, the new amount of wash medium for washing of the filtercake is added. In a continuous method, the amount of wash medium is calculated online and a warning is given, for example, in the event of exceedance of the optimal amount of wash medium.

The measurements may be considered/interpreted either online or subsequently in their entirety (process optimization).

More particularly, the measurement in the filtrate stream from a filter apparatus for cake filtration and the subsequent analysis of the measurements obtained can achieve a product-specific validation of the quality of the filtercake in association with the concentration of the secondary components in the filtrate stream or with the measurable cumulative parameter of the filtrate stream.

The method provides the following information as to the progression of the process:
   assessment of the progress of the process,
   identifying a stoppage/endpoint criterion
   identifying process faults, for example irregular filtercake structure Stability of the process
Pointers for optimization of the amount of wash medium This information is used to conduct an indirect filtercake analysis.

In some embodiments, the determination of refractive index is used as cumulative signal with respect to the secondary components.

Figure 1:
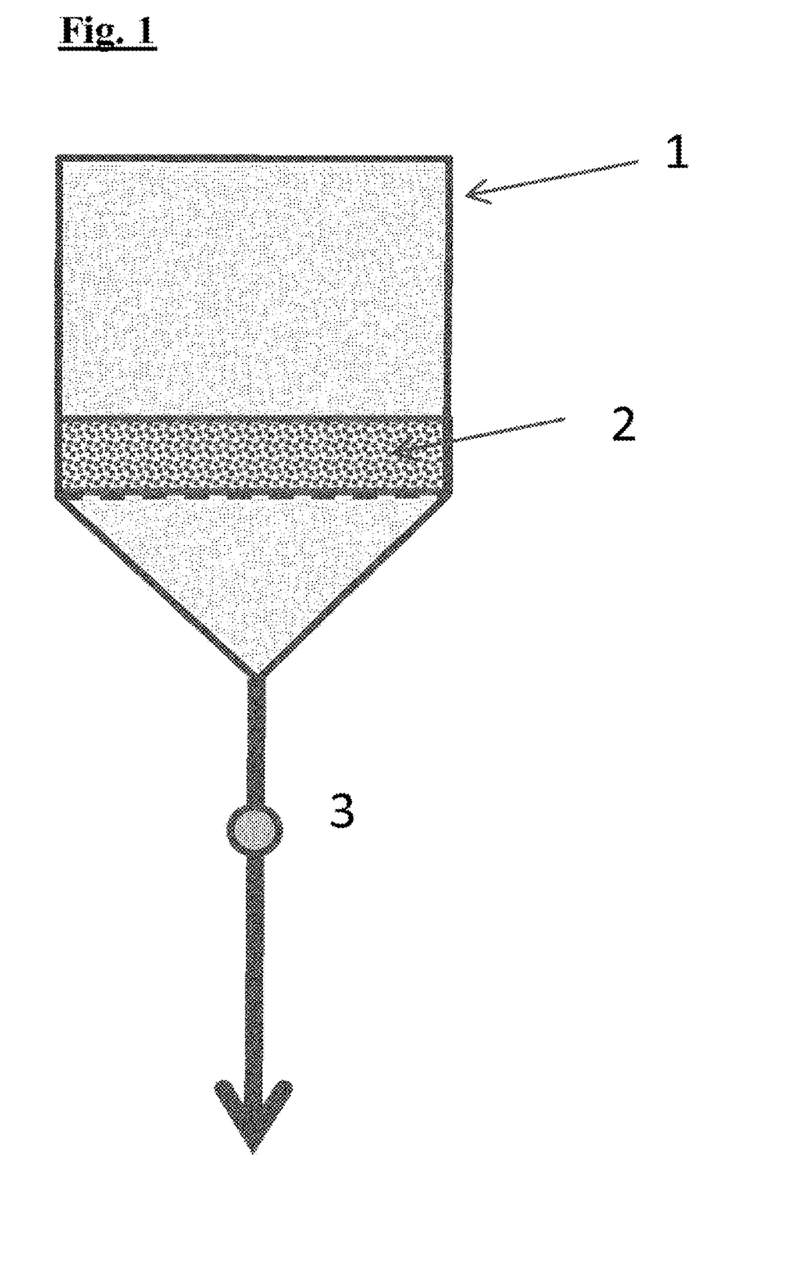
FIG. 1: Schematic diagram of a pressure suction filter
1 pressure suction filter, 2 filtercake, 3 measuring unit (e.g. example RI)

A measuring instrument positioned correspondingly in the filter apparatus is used to determine the measurement online, for example the refractive index in the filtrate stream. The measuring instrument is preferably installed in the filtrate outlet 5—either in an unpressurized manner or optionally in a pressure conduit (FIG. 1).

Figure 2:
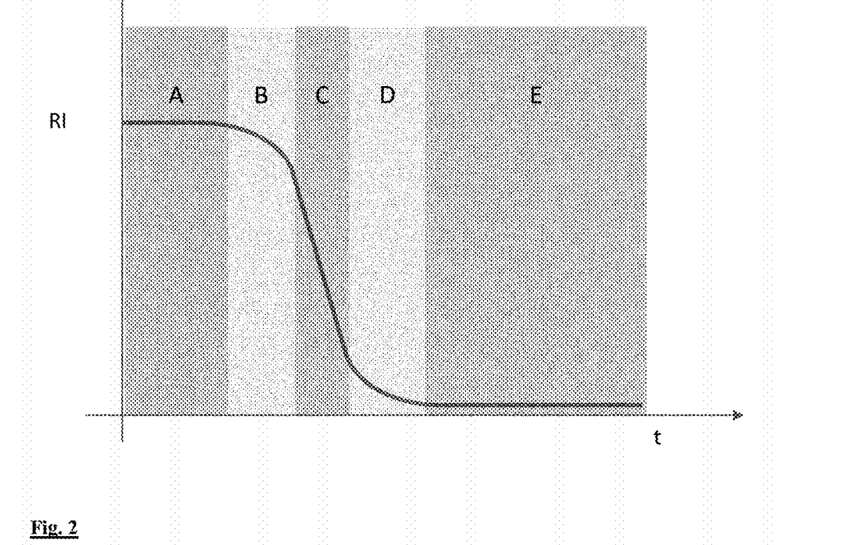
FIG. 2: Representation of trend of the measured value (RI) against time, divided into process phases:
A—displacement of the mother liquor, B—intermediate region, C—approved region, D—diffusion region, E—end of the wash effect.

The measurement and its variation over time can be used as a feature for quality control. Typically, the value measured online is compared with a calibration function ascertained beforehand between measurement and secondary components/product quality (FIG. 2).

The application further provides a filter apparatus comprising a wash medium feed, a filter element, a filtrate outlet and a measurement apparatus for measurement in the filtrate stream, wherein the measurement apparatus is selected for measurement of one or more parameters, for example refractive index, density, ultrasound transit time, pH, conductivity, redox potential and/or spectroscopic properties of the filtrate stream. In some embodiments, the measurement apparatus is installed in or on the filtrate outlet. Typically, the measurement apparatus is installed into the filtrate conduit of the filter apparatus.

Preferably, the filter apparatus additionally comprises a measurement apparatus for measuring the mass of filtrate. Typically, with the aid of a balance, the mass of filtrate in the filtrate collection vessel is ascertained/recorded. Alternatively, the mass of filtrate is ascertained/recorded with the aid of a flowmeter from the volume flow rate/mass flow rate.

Preferably, the measurement is combined with a measurement of the mass of filtrate.

Suitable filter apparatus are suction filters, centrifuges, Büchner funnels, frits, filter crucibles, drum filter, disk filter, belt filter and filter press, without being limited thereto.

Example A For Qualitative Assessment of a Solids Wash:

In a first set of experiments, the examination of the wash filtrates was examined in a displacement wash with the aid of the refractive index and is illustrated by way of example using the Sivanto product.

Figure 3:
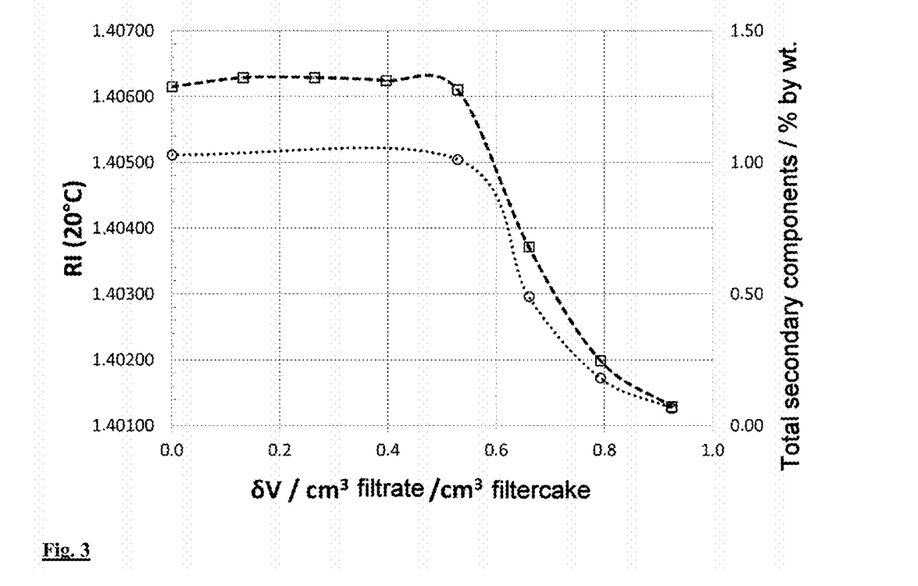
FIG. 3: Comparison of refractive index (□) and sum total of the secondary components (○) for the product Sivanto. The refractive index of pure butanol at 20° C. is 1.39932. (Example A).

For this purpose, in the filtration/wash, samples were taken in fractions from the filtrate stream at defined junctures. A refractometer (Abbemat300 from Anton Paar) was used to measure the refractive index offline, and it was compared with the refractive index of the wash solution (FIG. 3). Given regular progress of the process, the measurement would approach the refractive index of the wash solution. At first, the filtrate consisted of mother liquor, and therefore a plateau was observed in the progression of the refractive index. If the mother liquor is gradually displaced by wash medium in the displacement wash, the refractive index falls until it reaches a constant value. This value optimally reaches that of the wash medium used.

It has thus been shown that the refractive index is suitable as a cumulative signal for detecting decrease in concentration in the filtrate; variances from the expected value in the concentration and the filtration rate per unit time can be shown and recognized.

Correlation with the quality of the filtercake was to be examined in the individual case and was possible for Sivanto. Samples from the filtrate stream during the wash and filtercake, in each case after the end of washing (each experiment was conducted with different amounts of wash medium), were analyzed by HPLC.

In further experiments, a process refractometer was integrated into the filtrate outlet of the laboratory test bed for filtration as the online measurement technique. For this purpose, a process refractometer of the PR-43 type from KPatents having a measurement range of nD 1.32-1.53 was used. A flow adapter was used for the laboratory experiments.

Example B For Qualitative and Quantitative Assessment of a Solids Wash For Model Particles:

i. Experimental Procedure:

The filtration and wash experiments, in accordance with VDI Guideline 2762, were conducted in a 100 cm$^2$ laboratory pressure filter at 0.2 bar gauge and room temperature. The process refractometer (Abbemat300 from Anton) was integrated in the filtrate conduit. Refractive index and mass of filtrate were recorded in a time-resolved manner. After the end of the experiment, the height and mass of the filtercake were determined.

The filtration was ended at a saturation S of the filtercake of S=1, ultrapure water was layered cautiously onto the filtercake, and then the wash and mechanical moisture removal were conducted. After the end of the experiment, the refractive index of the mother liquor filtrate and of the wash filtrate was determined with an Abbemat 300 from Anton Paar at 23° C.

For conversion of the refractive indices ascertained (online) to NaCl concentrations and masses, a calibration line was recorded with the offline refractometer.

Model particles used were SiLibeads type S 0-50 μm glass beads (sourced from Sigmund Lindner GmbH). The solids concentration was 400 g/kg. The impurity used was NaCl in a concentration of 200 g/kg. The amount of suspension applied was about 1000 g, i.e. 120 g of NaCl was introduced into the system as a dissolved impurity. For the wash, 1192 g of ultrapure water was used (corresponding to a wash ratio 4.3 l of water/l of dry filtercake), in order to obtain a very clean filtercake.

Dried filtercake was resuspended in ultrapure water and subjected to extractive stirring. After centrifugation, the refractive index in the supernatant was determined. This corresponded to the value of water. In addition, free Cl$^-$ in the supernatant was determined as being 0 with the aid of a cuvette test. This means that the washed filtercake in this example did not contain any NaCl.

ii.

iii. Experimental Evaluation:

Online Analysis: Qualitative Evaluation

Figure 4:
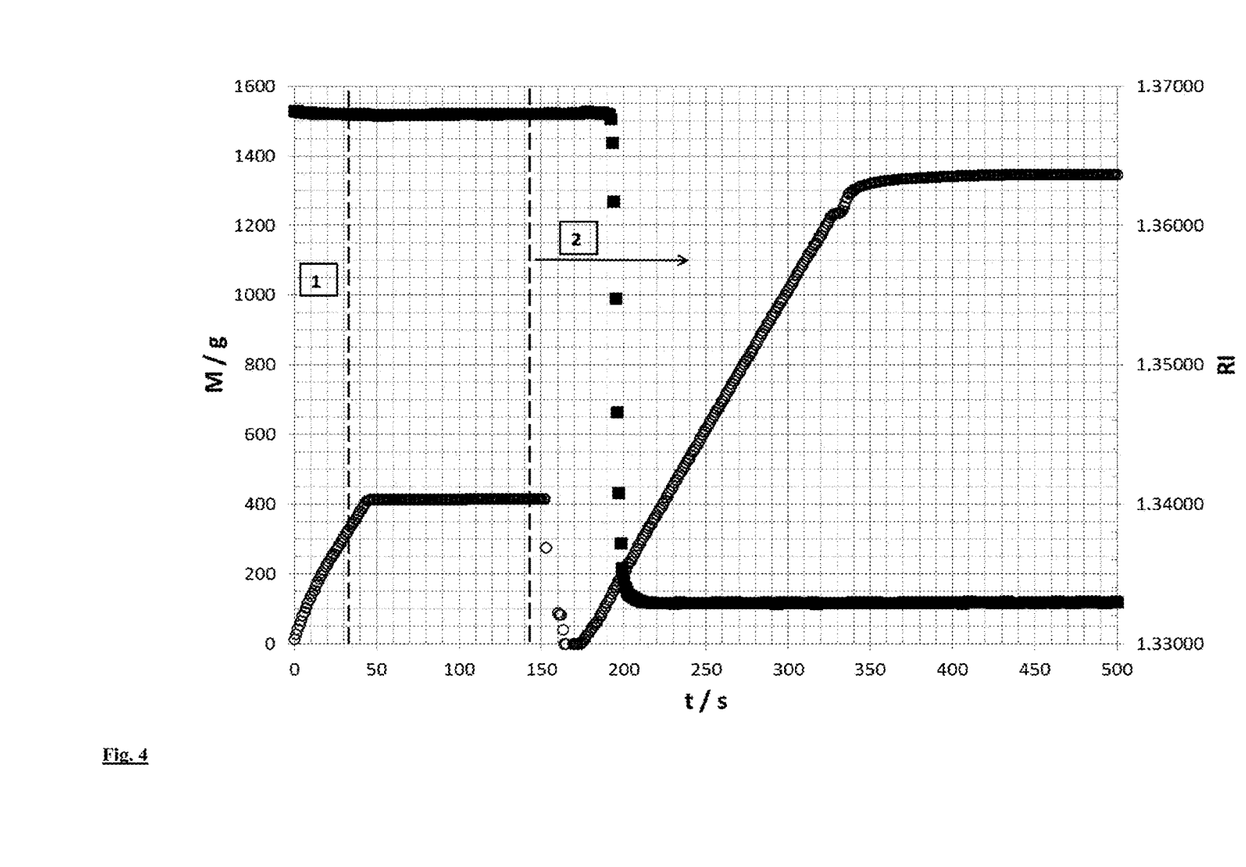
FIG. 4: Mass of filtrate M (○) and refractive index RI (■) as a function of time t. Region 1: filtration; region 2: wash.

In the parallel recording of mass of filtrate and refractive index, the following observations are made in the experiment of the progression according to FIG. 4:

The mass of filtrate increases during the filtration and wash, before remaining constant during the removal of moisture from the filtercake at the end of the experiment. The refractive index remains constant during the filtration since only mother liquor leaves the filtercake. In the subsequent wash, the refractive index decreases from the value of the mother liquor to the value of the pure wash medium.

If the plateau value of the nearly pure wash medium is attained, it can be assumed that the filtercake is not washed out any further by the displacement wash. In other words, for further purification, it is necessary to examine another wash strategy, for example slurry wash. If there is no further change in the value of the refractive index, the wash can be ended.

If the above data are based on the wash ratio, it is possible to directly ascertain the necessary amount of wash medium (see description below).

Figure 5:
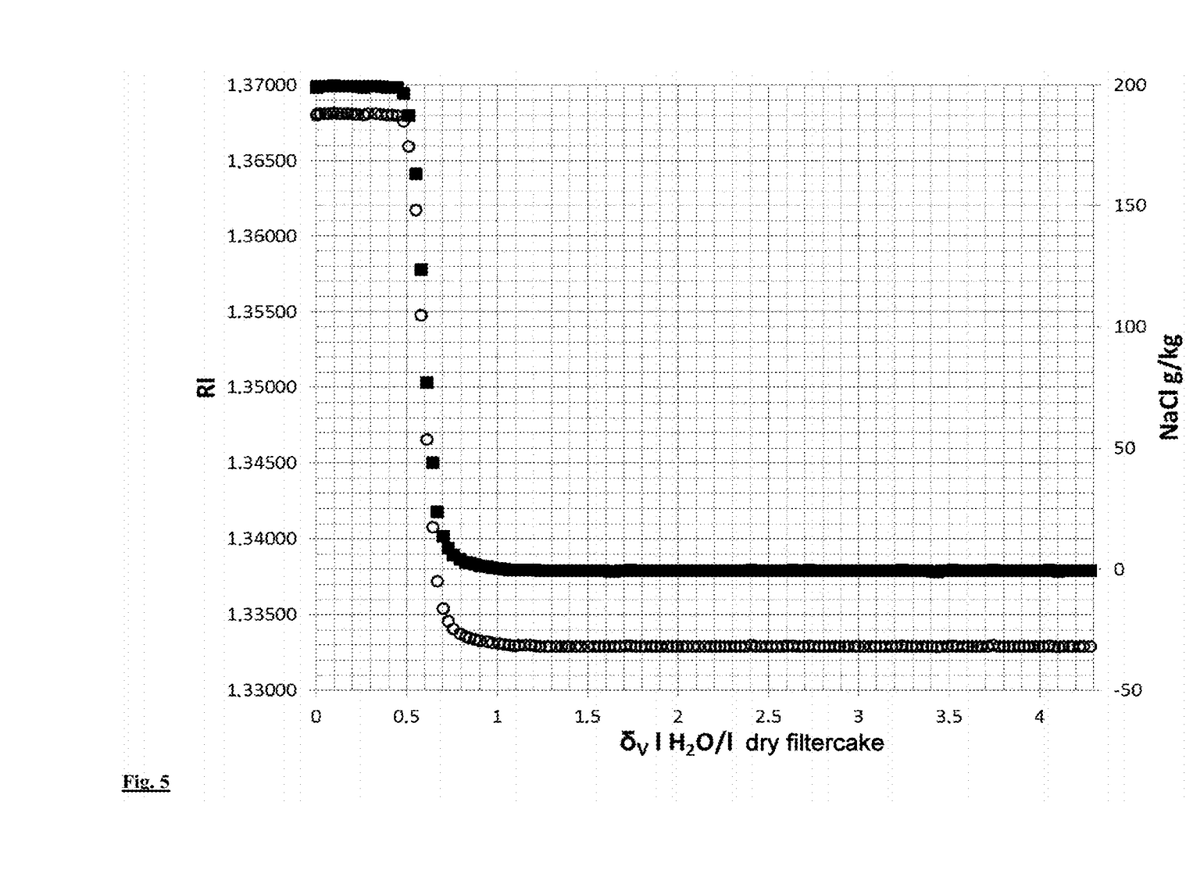
FIG. 5: NaCl concentration (■) and refractive index RI (○) as a function of the wash ratio.

FIG. 5 shows the progression of the refractive index (RI) against the wash ratio. It is clearly apparent that the constant measurement of the mother liquor filtrate is lowered by the increasing amount of water. At the end of the wash, a plateau value is attained.

The decrease in the RI and the settling at a constant value indicates that no further wash effect is achievable. In other words, even with greater wash ratios, the washout effect of the filtercake is not improved further. This purely qualitative evaluation can be utilized to end the wash in this example at a wash ratio of 1.5. This directly saves time and costs for wash medium. The recording of such data in operation can create a sufficient data basis for optimizations with regard to wash time and wash medium consumption.

Quantitative evaluation can be effected with a higher degree of complexity for real products. For the model project, this is set out hereinafter.

Online Analysis: Quantitative Evaluation

For the quantitative evaluation of the online measurement data, the plot of the RI and of the mass of filtrate against time for filtration and wash is chosen (see FIG. 5). For each period of time, the mass of filtrate and mass of NaCl can be calculated from the data recorded via an NaCl concentration-refractive index calibration line.

$$m_{NaCl,1} = (m_{filtrate,1} - m_{filtrate,0}) * c_{NaCl,1}$$

Alternatively, integration of the curve can also be performed as follows:
The area beneath the curve can be determined by the trapezium rule, such that the area covered can be ascertained in s*g/kg for each period of time:

Area in period of time: $A_1 = 0.5*(t_1-t_0)*(c_{NaCl,1} - c_{NaCl,0})$

By reference to the time interval and the mass of filtrate recorded in this time interval, it is possible to determine the mass of NaCl in the time interval (see tables 1 and 2).

$$m_{NaCl,1} = \frac{A_1}{(t_1 - t_0)} * (m_{filtrate,1} - m_{filtrate,0})$$

TABLE 1

Integration of the measurement data for filtration

| Time s | Delta t s | RI | Mass g | Delta m g | NaCl g/kg | Individual area s * g/kg | Individual area g/kg | Mass of NaCl g |
|---|---|---|---|---|---|---|---|---|
| 0.00 | 1.00 | 1.36823 | 12.4 | 12.4 | 200.2 | 197.7 | 197.7 | 2.46 |
| 1.00 | 1.00 | 1.36821 | 25.8 | 13.4 | 200.1 | 200.2 | 200.2 | 2.68 |
| 2.00 | 1.00 | 1.36824 | 41.2 | 15.4 | 200.3 | 200.2 | 200.2 | 3.08 |
| 3.00 | 1.00 | 1.36816 | 53.0 | 11.8 | 199.8 | 200.1 | 200.1 | 2.36 |
| 4.00 | 1.00 | 1.36813 | 66.1 | 13.1 | 199.7 | 199.7 | 199.7 | 2.62 |
| 5.00 | 1.00 | 1.36816 | 80.1 | 14.0 | 199.8 | 199.7 | 199.7 | 2.79 |
| 6.00 | 1.00 | 1.36812 | 90.8 | 10.7 | 199.6 | 199.7 | 199.7 | 2.14 |
| 7.00 | 1.00 | 1.36811 | 103.1 | 12.3 | 199.5 | 199.6 | 199.6 | 2.45 |
| 8.00 | 1.00 | 1.3681 | 115.8 | 12.7 | 199.5 | 199.5 | 199.5 | 2.54 |
| 9.00 | 1.00 | 1.36811 | 126.1 | 10.4 | 199.5 | 199.5 | 199.5 | 2.07 |
| 10.00 | 1.00 | 1.36812 | 134.6 | 8.5 | 199.6 | 199.6 | 199.6 | 1.69 |
| 11.00 | 1.00 | 1.36808 | 144.1 | 9.4 | 199.4 | 199.5 | 199.5 | 1.88 |
| 12.00 | 1.00 | 1.36806 | 152.9 | 8.8 | 199.3 | 199.3 | 199.3 | 1.76 |
| 13.00 | 1.00 | 1.36808 | 166.6 | 13.7 | 199.4 | 199.3 | 199.3 | 2.73 |
| 14.00 | 1.00 | 1.36805 | 176.0 | 9.5 | 199.2 | 199.3 | 199.3 | 1.89 |
| 15.00 | 1.00 | 1.36811 | 186.0 | 10.0 | 199.5 | 199.4 | 199.4 | 1.99 |
| 16.00 | 1.00 | 1.3681 | 194.8 | 8.7 | 199.5 | 199.5 | 199.5 | 1.74 |
| 17.00 | 1.00 | 1.36808 | 202.7 | 7.9 | 199.4 | 199.4 | 199.4 | 1.57 |
| 18.00 | 1.00 | 1.36803 | 211.1 | 8.4 | 199.1 | 199.2 | 199.2 | 1.68 |
| 19.00 | 1.00 | 1.36803 | 220.1 | 9.0 | 199.1 | 199.1 | 199.1 | 1.79 |
| 20.00 | 1.00 | 1.36802 | 228.3 | 8.2 | 199.0 | 199.1 | 199.1 | 1.63 |
| 21.00 | 1.00 | 1.36803 | 236.6 | 8.3 | 199.1 | 199.1 | 199.1 | 1.65 |
| 22.00 | 1.00 | 1.36804 | 243.7 | 7.2 | 199.2 | 199.1 | 199.1 | 1.43 |
| 23.00 | 1.00 | 1.36803 | 252.4 | 8.7 | 199.1 | 199.1 | 199.1 | 1.73 |
| 24.00 | 1.00 | 1.36803 | 258.0 | 5.6 | 199.1 | 199.1 | 199.1 | 1.12 |
| 25.00 | 1.00 | 1.36803 | 266.9 | 8.9 | 199.1 | 199.1 | 199.1 | 1.78 |
| 26.00 | 1.00 | 1.36803 | 273.8 | 6.9 | 199.1 | 199.1 | 199.1 | 1.37 |
| 27.00 | 1.00 | 1.36802 | 280.8 | 7.0 | 199.0 | 199.1 | 199.1 | 1.40 |
| 28.00 | 1.00 | 1.36803 | 289.3 | 8.5 | 199.1 | 199.1 | 199.1 | 1.70 |
| 29.00 | 1.00 | 1.36803 | 297.8 | 8.5 | 199.1 | 199.1 | 199.1 | 1.69 |
| 30.00 | 1.00 | 1.36803 | 305.2 | 7.4 | 199.1 | 199.1 | 199.1 | 1.47 |
| 31.00 | 1.00 | 1.36802 | 313.2 | 8.0 | 199.0 | 199.1 | 199.1 | 1.58 |
| 32.00 | 1.00 | 1.368 | 320.6 | 7.4 | 198.9 | 199.0 | 199.0 | 1.47 |
| 33.00 | 1.00 | 1.36797 | 328.4 | 7.9 | 198.8 | 198.8 | 198.8 | 1.56 |
| 34.00 | 1.00 | 1.368 | 335.3 | 6.8 | 198.9 | 198.8 | 198.8 | 1.36 |
| 35.00 | 1.00 | 1.36797 | 342.6 | 7.3 | 198.8 | 198.8 | 198.8 | 1.45 |
| 36.00 | 1.00 | 1.36803 | 350.1 | 7.5 | 199.1 | 198.9 | 198.9 | 1.49 |
| 37.00 | 1.00 | 1.36803 | 357.3 | 7.3 | 199.1 | 199.1 | 199.1 | 1.44 |
| 38.00 | 1.00 | 1.368 | 365.2 | 7.8 | 198.9 | 199.0 | 199.0 | 1.56 |
| 39.00 | 1.00 | 1.36795 | 373.2 | 8.0 | 198.6 | 198.8 | 198.8 | 1.59 |
| 40.00 | 1.00 | 1.36798 | 380.3 | 7.2 | 198.8 | 198.7 | 198.7 | 1.43 |
| 41.00 | 1.00 | 1.368 | 387.4 | 7.1 | 198.9 | 198.9 | 198.9 | 1.41 |
| 42.00 | 1.00 | 1.36797 | 393.4 | 5.9 | 198.8 | 198.8 | 198.8 | 1.18 |
| 43.00 | 1.00 | 1.36803 | 400.8 | 7.4 | 199.1 | 198.9 | 198.9 | 1.47 |

TABLE 1-continued

Integration of the measurement data for filtration

| Time s | Delta t s | RI | Mass g | Delta m g | NaCl g/kg | Individual area s * g/kg | Individual area g/kg | Mass of NaCl g |
|---|---|---|---|---|---|---|---|---|
| 44.00 | 1.00 | 1.368 | 409.0 | 8.2 | 198.9 | 199.0 | 199.0 | 1.63 |
| 45.00 | 1.00 | 1.36794 | 411.4 | 2.4 | 198.6 | 198.8 | 198.8 | 0.48 |
| 46.00 | 1.00 | 1.36794 | 412.8 | 1.4 | 198.6 | 198.6 | 198.6 | 0.27 |
| 47.00 | 1.00 | 1.36794 | 413.4 | 0.6 | 198.6 | 198.6 | 198.6 | 0.13 |
| 48.00 | 1.00 | 1.36794 | 413.7 | 0.3 | 198.6 | 198.6 | 198.6 | 0.06 |
| 49.00 | 1.00 | 1.36794 | 414.0 | 0.3 | 198.6 | 198.6 | 198.6 | 0.06 |
| 50.00 | 1.00 | 1.36792 | 414.2 | 0.2 | 198.5 | 198.5 | 198.5 | 0.04 |
| 51.00 | 1.00 | 1.3679 | 414.2 | 0.0 | 198.4 | 198.4 | 198.4 | 0.00 |
| 52.00 | 1.00 | 1.36794 | 414.2 | 0.0 | 198.6 | 198.5 | 198.5 | 0.00 |

Total NaCl filtration: 83 g

TABLE 2

Integration of the measurement data for wash

| Time s | Delta t s | RI | Mass g | Delta m g | NaCl g/kg | Individual area s * g/kg | Individual area g/kg | Mass of NaCl g |
|---|---|---|---|---|---|---|---|---|
| 172.00 | 1.00 | 1.36804 | 0.0 | 0.0 | 199.2 | 199.3 | 199.3 | 0.00 |
| 173.00 | 1.00 | 1.36805 | 0.0 | 0.0 | 199.2 | 199.2 | 199.2 | 0.00 |
| 174.00 | 1.00 | 1.36811 | 1.1 | 1.1 | 199.5 | 199.4 | 199.4 | 0.22 |
| 175.00 | 1.00 | 1.36811 | 5.7 | 4.6 | 199.5 | 199.5 | 199.5 | 0.91 |
| 176.00 | 1.00 | 1.36811 | 13.5 | 7.8 | 199.5 | 199.5 | 199.5 | 1.56 |
| 177.00 | 1.00 | 1.36813 | 19.9 | 6.4 | 199.7 | 199.6 | 199.6 | 1.27 |
| 178.00 | 1.00 | 1.36817 | 26.0 | 6.1 | 199.9 | 199.8 | 199.8 | 1.21 |
| 179.00 | 1.00 | 1.36812 | 33.1 | 7.2 | 199.6 | 199.7 | 199.7 | 1.43 |
| 180.00 | 1.00 | 1.36811 | 38.2 | 5.0 | 199.5 | 199.6 | 199.6 | 1.00 |
| 181.00 | 1.00 | 1.36811 | 46.7 | 8.5 | 199.5 | 199.5 | 199.5 | 1.70 |
| 182.00 | 1.00 | 1.36811 | 52.9 | 6.2 | 199.5 | 199.5 | 199.5 | 1.24 |
| 183.00 | 1.00 | 1.3681 | 59.4 | 6.6 | 199.5 | 199.5 | 199.5 | 1.31 |
| 184.00 | 1.00 | 1.36809 | 63.6 | 4.2 | 199.4 | 199.5 | 199.5 | 0.83 |
| 185.00 | 1.00 | 1.36804 | 72.2 | 8.6 | 199.2 | 199.3 | 199.3 | 1.71 |
| 186.00 | 1.00 | 1.36811 | 79.9 | 7.7 | 199.5 | 199.3 | 199.3 | 1.54 |
| 187.00 | 1.00 | 1.36812 | 90.9 | 11.0 | 199.6 | 199.6 | 199.6 | 2.19 |
| 188.00 | 1.00 | 1.36809 | 100.2 | 9.3 | 199.4 | 199.5 | 199.5 | 1.86 |
| 189.00 | 1.00 | 1.36803 | 108.6 | 8.3 | 199.1 | 199.3 | 199.3 | 1.66 |
| 190.00 | 1.00 | 1.36803 | 117.0 | 8.4 | 199.1 | 199.1 | 199.1 | 1.68 |
| 191.00 | 1.00 | 1.36799 | 125.5 | 8.5 | 198.9 | 199.0 | 199.0 | 1.69 |
| 192.00 | 1.00 | 1.36763 | 133.8 | 8.3 | 196.8 | 197.8 | 197.8 | 1.65 |
| 193.00 | 1.00 | 1.36597 | 142.3 | 8.5 | 187.4 | 192.1 | 192.1 | 1.63 |
| 194.00 | 1.00 | 1.36174 | 153.2 | 10.9 | 163.3 | 175.3 | 175.3 | 1.91 |
| 195.00 | 1.00 | 1.35479 | 161.6 | 8.5 | 123.8 | 143.6 | 143.6 | 1.22 |
| 196.00 | 1.00 | 1.34658 | 170.0 | 8.3 | 77.1 | 100.4 | 100.4 | 0.84 |
| 197.00 | 1.00 | 1.3408 | 179.9 | 9.9 | 44.2 | 60.7 | 60.7 | 0.60 |
| 198.00 | 1.00 | 1.33723 | 186.3 | 6.5 | 23.9 | 34.1 | 34.1 | 0.22 |
| 199.00 | 1.00 | 1.33544 | 195.9 | 9.6 | 13.7 | 18.8 | 18.8 | 0.18 |
| 200.00 | 1.00 | 1.33457 | 204.0 | 8.1 | 8.8 | 11.3 | 11.3 | 0.09 |
| 201.00 | 1.00 | 1.33406 | 211.9 | 7.9 | 5.9 | 7.3 | 7.3 | 0.06 |
| 202.00 | 1.00 | 1.33376 | 221.4 | 9.6 | 4.2 | 5.0 | 5.0 | 0.05 |
| 203.00 | 1.00 | 1.33355 | 230.6 | 9.2 | 3.0 | 3.6 | 3.6 | 0.03 |
| 204.00 | 1.00 | 1.33348 | 236.5 | 5.9 | 2.6 | 2.8 | 2.8 | 0.02 |
| 205.00 | 1.00 | 1.33339 | 244.9 | 8.4 | 2.1 | 2.3 | 2.3 | 0.02 |
| 206.00 | 1.00 | 1.33331 | 252.8 | 7.9 | 1.6 | 1.8 | 1.8 | 0.01 |
| 207.00 | 1.00 | 1.33323 | 263.6 | 10.8 | 1.2 | 1.4 | 1.4 | 0.01 |
| 208.00 | 1.00 | 1.33316 | 271.5 | 7.9 | 0.8 | 1.0 | 1.0 | 0.01 |
| 209.00 | 1.00 | 1.33309 | 281.7 | 10.2 | 0.4 | 0.6 | 0.6 | 0.01 |
| 210.00 | 1.00 | 1.33307 | 289.7 | 8.0 | 0.3 | 0.3 | 0.3 | 0.00 |
| 211.00 | 1.00 | 1.333 | 297.7 | 8.0 | −0.1 | 0.1 | 0.1 | 0.00 |
| 212.00 | 1.00 | 1.33299 | 305.8 | 8.1 | −0.2 | −0.2 | −0.2 | 0.00 |

Total NaCl wash: 33 g

If all masses of NaCl from the individual periods are added up—i.e. measurement curves are integrated—the result is the mass of NaCl washed out throughout the experiment. In this example, this amounts to 116 g of NaCl, corresponding to a variance of about 3% from the amount of NaCl used.

Mass Balance From Offline Determinations:

In order to verify the mass balance from the online measurements, the masses of filtrate and refractive indices in the filtrates collected were determined. This can be used to calculate a mass balance. 120 g of NaCl were used in the experiment detailed. 414 g of mother liquor filtrate with a concentration of 200 g/kg NaCl and 1347 g of wash filtrate with a concentration of 24 g/kg NaCl were collected. The result is 83 g of NaCl dissolved in the mother liquor filtrate and 32 g of NaCl dissolved in the wash filtrate. Since no NaCl was detectable in the filtercake, it was possible to recover 115 g of NaCl in the filtrates by measurement technology.

Conclusions as to the Quality of the Wash Conducted

The refractive index decreases during the wash from the (starting) value of the mother liquor to a lower (plateau) value at the end of the wash. The curve thus falls with a particular slope. If there is any change in this slope, it is possible to conclude the quality of the wash therefrom.

Figure 6A:
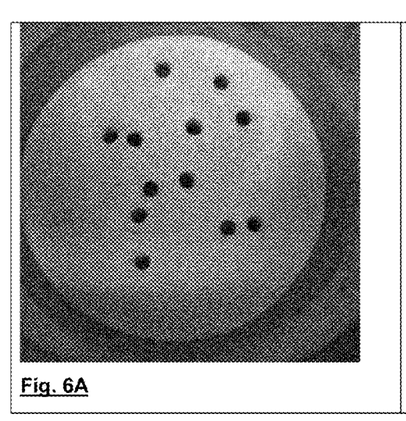
FIG. 6A: Filtercake with channels, removal of moisture after mother liquor filtration.
Figure 6B:
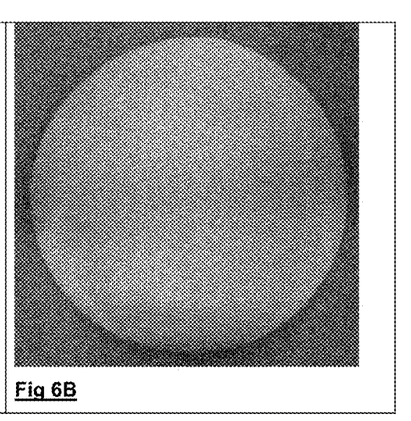
FIG. 6B: Filtercake after mechanical removal of moisture after wash.
Figure 7:
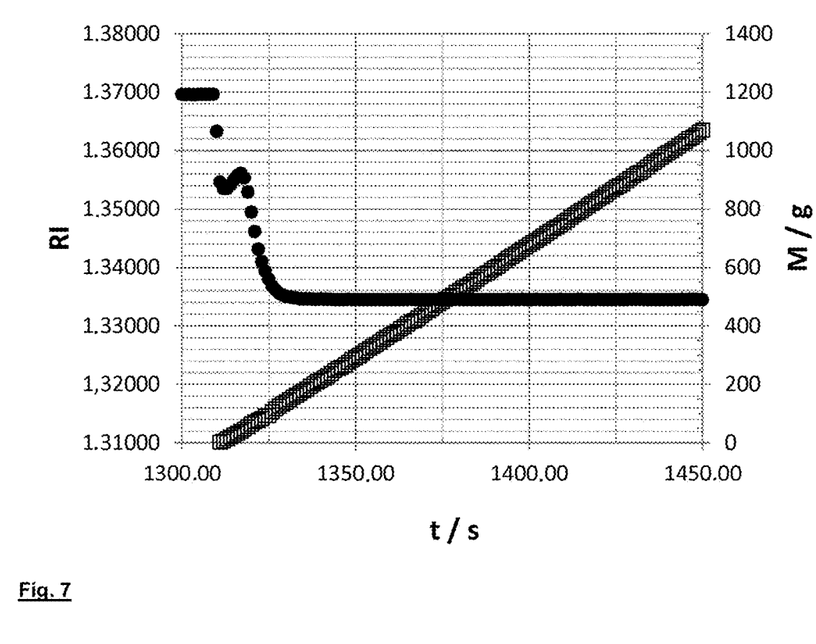
FIG. 7: □ mass (M) and ● refractive index (RI) as a function of time (t).
Figure 8:
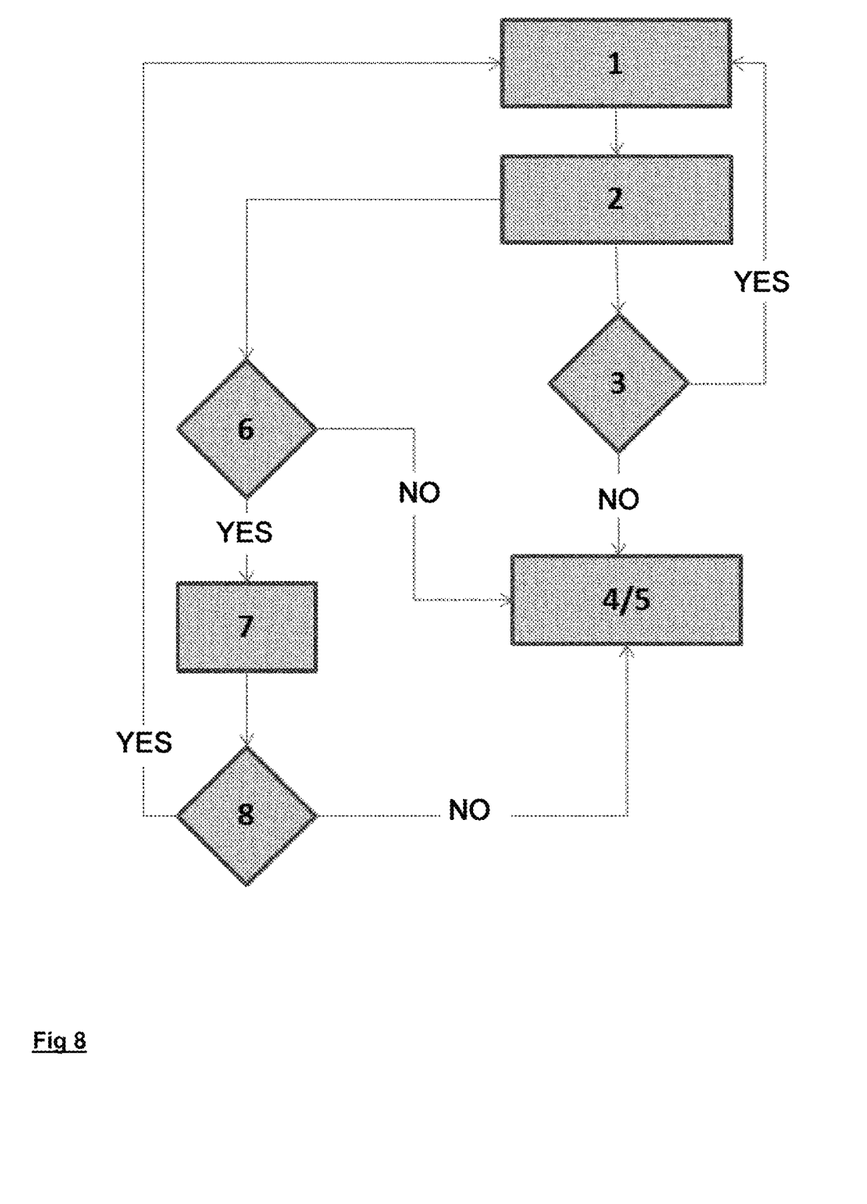
FIG. 8: Block diagram of the method for control of the washing operation
1—Input of measurement data
2—Calculation of the first derivative
3—First derivative>0 or greater than a predefined value?
4—End of the washing operation
5—Error message
6—First derivative within a predefined range C?
7—Calculation of the average slope and variability (steps e-g)
8—Average slope and variability within the predefined ranges?

An example is set out below with the model system described above:
Rods were inserted into the suspension applied in order to artificially produce channels in the filtercake. The moisture was removed from the filtercake after the mother liquor filtration (FIG. 6A). FIG. 7 shows the progression and in particular the increase in the refractive index. This suggests that the wash front does not run homogeneously through the filtercake, but that discontinuities—channels here—have formed. This would not be apparent solely from visual inspection of the filtercake after the wash, as apparent in FIG. 6B. In an inspection of the filtercake from above, as is technically possible, it is not possible to see any cracks, channels, etc. that are hidden within the filtercake.

The invention claimed is:
1. A method of monitoring a filtration and washing operation on a solid-state bulk material in a filter apparatus for cake filtration, wherein the filter apparatus comprises a wash medium feed, a filter element for the cake filtration and a filtrate outlet, at least one measurement apparatus for measurement of parameter values in a filtrate stream, installed in or on the filtrate outlet, the method comprising:
separating the solid-state bulk material in a suspension medium using the filter element for the cake filtration;
leading off the suspension medium in a form of the filtrate stream into the filtrate outlet;
measuring, in parallel, the parameter values of refractive index of the filtrate stream and mass of a filtrate of the filtrate stream over a period of the filtration and washing operation; and
conducting a computer-implemented change analysis of the parameter values over the period of the filtration and washing operation to ascertain at least one of an end of the filtration and washing operation or an effectiveness of the filtration and washing operation;
wherein the end of the filtration and washing operation is ascertained by the following steps:
a) providing the parameter values measured to an evaluation system;
b) calculating a first derivative of a measurement curve between measurement data at times t−1 and t;
c) if the first derivative from b) is more than zero or more than a predefined value for a derivative of the measurement curve at which the method is considered to have ended, the filtration and washing operation is continued;
d) if the first derivative from b) is zero or less than or equal to the predefined value, the filtration and washing operation is ended and the end of the filtration and washing operation is communicated via a user interface;
and/or
wherein the effectiveness of the filtration and washing operation is ascertained by the following steps:
a) transferring measurement values of the measurement data to the evaluation system over a predefined period of time in the filtration and washing operation;
b) calculating a first derivative of a measurement curve between the measurement data at times t−1 and 5;
c) comparing the first derivative with an approved predefined range of values for the first derivative in which the filtration and washing operation is considered to be effective;
d) ending the filtration and washing operation and giving notice of a variance via the user interface if the first derivative is outside the approved predefined range of values from c);
alternatively or in addition to step d);
e) calculating a period C in which the first derivative is within the approved predefined range of values from c);
f) calculating a slope value as an average slope over the period C from e);
g) calculating a variability of the slope value over the period C from e);
h) if the slope value from f) is within a predefined working range for the slope value and the variability of the slope value from g) is less than or equal to a predefined tolerance limit for the variability at which the filtration and washing operation is considered to be effective, the filtration and washing operation is continued; and
i) if the slope value from f) is outside the predefined working range for the slope value or the variability of the slope value from g) is above the predefined toler- ance limit for the variability, a warning is issued or the filtration and washing operation is ended.

2. The method of claim 1, wherein the parameter values over the period of the filtration and washing operation are transmitted as the measurement data to an archiving module for storage of the measurement data and stored with a timestamp t.

3. The method of claim 1, wherein an amount of the wash medium feed consumed for the filtration and washing operation until the end of the filtration and washing operation is ascertained and fixed as an optimal amount of the wash medium feed for a subsequent filtration and washing operation.

4. The method of claim 1, wherein the method is used for online monitoring of the filtration and washing operation.

5. The method of claim 1, wherein at least one concentration of at least one component in the filtrate stream or at least one measurable cumulative parameter of the filtrate stream is ascertained.

\* \* \* \* \*